United States Patent
Stoll et al.

(10) Patent No.: US 8,798,867 B2
(45) Date of Patent: Aug. 5, 2014

(54) METHOD FOR OPERATING A PEDESTRIAN PROTECTION SYSTEM AND A MOTOR VEHICLE

(71) Applicant: Audi AG, Ingolstadt (DE)

(72) Inventors: Johann Stoll, Karlskron (DE); Franz Roth, Altmannstein (DE); Carlos Garcia de Caceres, München (DE); Verena Horz, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/742,984

(22) Filed: Jan. 16, 2013

(65) Prior Publication Data

US 2013/0184940 A1  Jul. 18, 2013

(30) Foreign Application Priority Data

Jan. 17, 2012  (DE) .......................... 10 2012 000 792

(51) Int. Cl.
*B60R 21/0134* (2006.01)
*G01S 17/93* (2006.01)

(52) U.S. Cl.
USPC ............... 701/45; 701/96; 701/301; 340/435; 180/274

(58) Field of Classification Search
USPC ........... 701/45, 301, 96; 340/435, 425.5, 436; 180/271, 274
See application file for complete search history.

(56) References Cited

U.S. PATENT DOCUMENTS

| | | | | |
|---|---|---|---|---|
| 2006/0213714 | A1* | 9/2006 | Igawa | 180/274 |
| 2007/0112513 | A1* | 5/2007 | Mathevon et al. | 701/301 |
| 2008/0097699 | A1* | 4/2008 | Ono | 701/300 |

FOREIGN PATENT DOCUMENTS

| | | |
|---|---|---|
| DE | 100 13 563 | 10/2001 |
| DE | 101 06 653 | 8/2002 |
| DE | 101 41 730 | 3/2003 |
| DE | 103 55 344 | 6/2005 |
| DE | 102005012136 | 10/2005 |
| DE | 102005012357 | 10/2005 |
| DE | 102004036833 | 2/2006 |
| DE | 102004036501 | 3/2006 |
| DE | 102005006763 | 8/2006 |
| DE | 102007029987 | 1/2009 |
| GB | 2 400 353 | 10/2004 |
| WO | WO 97/18108 | 5/1997 |

* cited by examiner

*Primary Examiner* — Tan Q Nguyen
(74) *Attorney, Agent, or Firm* — Henry M Feiereisen LLC

(57) ABSTRACT

A method for operating a pedestrian protection system in a motor vehicle for reducing the severity of an accident in a frontal collision with pedestrians includes evaluating the measurement data from at least one detection device depending on at least one trigger condition, wherein the trigger condition includes a height criterion evaluating whether a height of a collision object determined from measurement data from an optical detection device exceeds a height threshold value.

11 Claims, 2 Drawing Sheets

METHOD FOR OPERATING A PEDESTRIAN PROTECTION SYSTEM AND A MOTOR VEHICLE

CROSS-REFERENCES TO RELATED APPLICATIONS

This application claims the priority of German Patent Application, Serial No. 10 2012 000 792.2, filed Jan. 17, 2012, pursuant to 35 U.S.C. 119(a)-(d), the content of which is incorporated herein by reference in its entirety as if fully set forth herein.

BACKGROUND OF THE INVENTION

The present invention relates to a method for operating a pedestrian protection system for reducing the severity of an accident in frontal collisions with pedestrians in a motor vehicle, as well as to a motor vehicle having a pedestrian protection system.

Various measurements have recently been proposed for protecting pedestrians in a frontal accident with motor vehicles. These measurements are realized with safety systems, in particular passive measures. Pedestrian protection systems are known wherein one or several collision sensors (contact sensors serving as detection devices are installed in the front region (front end) of the motor vehicle. These collision sensors typically detect an impact of a pedestrian or of another object. A corresponding algorithm evaluates different features of the measurement data (sensor signals) and decides based on a trigger condition, which may also include several nested criteria, whether a safety system should be triggered, in particular as a passive measure.

The following discussion of related art is provided to assist the reader in understanding the advantages of the invention, and is not to be construed as an admission that this related art is prior art to this invention.

Conventional sensors are frequently unable to supply a reliable classification with respect to a real pedestrian, and corresponding algorithms are also designed for triggering a replacement impactor, so that the aforementioned features and/or safety systems can also be triggered by mistake when the impact of an object at the front end of the motor vehicle is similar to that of a pedestrian or of a replacement impactor. Optical detection devices, in particular optical sensors, are typically also not able to identify with sufficient reliability the class "pedestrian", potentially causing false triggering.

Although false triggering is still acceptable with reversible measures, i.e. with safety systems having actuators constructed to also restore the triggered safety system, because they can be readily restored by the driver himself or by a corresponding repair shop, for example in the case of a returnable crash-active engine hood. However, a driver will probably complain about an erroneously triggered safety system, in particular an exterior airbag. In addition, the view of the driver is disadvantageously obscured when an exterior airbag on the windshield is erroneously triggered.

For example, when evaluating optical measurement data, false triggering may be caused by airborne plastic bags, birds, branches and the like, wherein with a contact sensor or collision sensor in the front end false triggering may be caused by small animals, wildlife, airborne plastic bags, posts, guard rails, balls and the like. It has therefore been proposed to use two independent sensors, each confirming an event to prevent false triggering. For example, a variable of the first object characterizing a mass and/or a hardness could be evaluated based on the applied force and the relative speed, with the object being recognized as a certain object type when the estimated variable characterizing the mass and/or the hardness is within a predetermined range. However, this requires a very complex evaluation algorithm which in itself is susceptive to errors and which must link a large number of features of the measurement data in a complex manner, in particular also with respect to criteria of the trigger condition.

It would therefore be desirable and advantageous to address this problem and to obviate other prior art shortcomings by providing a method for operating a pedestrian protection system, wherein an additional plausibility criterion within the trigger condition can be realized in a simple manner.

SUMMARY OF THE INVENTION

According to one aspect of the present invention, a method for operating a pedestrian protection system in a motor vehicle for reducing severity of an accident in a frontal collision with a pedestrian includes evaluating measurement data from at least one detection device, and triggering at least one safety system depending on at least one trigger condition derived from the evaluated measurement data, wherein the at least one trigger condition includes a height criterion indicating whether a height of a collision object determined from measurement data from an optical detection device exceeds a height threshold value.

According to another aspect of the invention, a motor vehicle includes an optical detection device, at least one safety system and a pedestrian protection system for reducing the severity of an accident in a frontal collision with pedestrians. The pedestrian protection system includes a control device configured to trigger at least one safety system depending on at least one trigger condition that evaluates measurement data from at least one detection device, wherein the at least one trigger condition includes a height criterion indicating whether a height of a collision object determined from measurement data from an optical detection device exceeds a height threshold value. A conventional bus system of a motor vehicle, for example a CAN bus, may be provided for communication between the optical detection device and optionally additional detection devices and the control device.

According to an advantageous feature of the present invention, an optical detection device, in particular an optical sensor, supplies measurement data, from which the height of the collision object can at least be estimated. Particularly suited for this purpose are three-dimensional detection devices, because the height of the collision object can then be particularly easily determined. It may also be advantageous to implement a mono-camera configuration realized in the capture region by arranging the optical detection device for example at the height of the engine hood, because in the aforementioned example only objects that are taller than the engine hood can be detected. For example, it can then be determined whether the collision object is at risk at all of hitting the engine hood and from there the windshield, for example by flipping over, so that the trigger condition can be at least modified depending on a height criterion.

The proposed addition of a height criterion to the trigger condition can be easily realized and does not require a complex sensor arrangement, which would be subject to complex technical requirements.

According to another advantageous feature of the present invention, the measurement accuracy may be improved by evaluating in the context of the trigger condition measurement data from at least two detection devices that operate based on different principles, in particular the optical detection device and at least one collision sensor which is triggered upon contact with a collision object. In this situation, the height criterion may be used only to establish plausibility of an accident involving a pedestrian, because in addition to the optical detection device, at least one additional detection device based on a different measurement principle is present, whose measurement data are also taken into consideration in the at least one trigger condition. The additional detection device may advantageously include the currently frequently installed collision sensors which are capable of measuring contact of an object with the motor vehicle in different ways. According to another advantageous feature of the present invention, acceleration sensors may be installed on the bumper of the motor vehicle and/or contact sensors may be used, such as optical waveguide fibers, force-sensitive sensors and the like. A number of different possibilities known in the art are feasible.

According to another advantageous feature of the present invention, for satisfying the height criterion, at least one threshold value relating to a criterion concerning the measurement data of the additional detection device may be adapted to the trigger condition so as to more easily trigger the safety system. In this embodiment, the height criterion may be applied to add plausibility so that threshold values are adapted which particularly determine triggering of the safety system as a function of the measurement data of the additional detection device. For example, the measurement data of the collision sensors may satisfy the respective criterion already in the event of a minor contact, when the height exceeds the height threshold value, whereas when the height criterion is not exceeded, unambiguous measurement data from the collision sensors must be present that relate to a larger and/or heavier and/or faster object, and the like.

It should be noted here that other possibilities within the context of the trigger condition are also feasible for considering the height criterion. For example, the height criterion may be linked by an AND-operation with a criterion relating to the measurement data of the additional detection device, or the measurement data from the optical detection device and from the additional detection device may be evaluated to form a common collision value, which is then evaluated against a criterion that implicitly includes the height criterion, and the like.

According to another advantageous feature of the present invention, the height threshold value may be selected as the height of a particular point of the engine hood above ground, in particular of a front end of the engine hood above ground. In this case, the height criterion is then always satisfied when the collision object is taller than the height of the front edge of the engine hood, meaning that there is the risk that the collision object flips over the engine hood. Such height estimation has proven to be particularly useful to exclude certain objects that are less tall than the height of the engine hood.

According to another advantageous feature of the present invention, a three-dimensional optical detection device may be used as an optical detection device, wherein a distance can also be associated with individual pixels. In this way, a height can be determined significantly more easily since the depth information has been provided. In a preferred exemplary embodiment, a PMD camera is used as three-dimensional optical detection device. Such cameras, frequently also referred to as TOF cameras (time-of-flight cameras) supply for each pixel in addition to an optical information also distance information which can then be directly processed. PMD cameras are also very fast. Also feasible are stereo cameras where distance information is computed back from two images captured at different angles; however, a mono-camera may also be used, with which an evaluation device evaluating the optical flux of the measurement data is associated. Algorithms are known in the art which allow deriving the optical flux from a time sequence of camera images and deriving a distance from the optical flux.

According to another advantageous feature of the present invention, the optical detection device may be arranged in the region of a windshield of the motor vehicle, in particular on the upper edge of the windshield and/or in the interior of the motor vehicle. For example, the optical detection device may be arranged in a rear view mirror and oriented in the travel direction of the motor vehicle or in a mount of a rear view mirror; however, other, in particular central installation locations on the upper edge of the windshield are also feasible. Other installation sites in the region of the windshield are also feasible, for example in the A-columns, in the outside mirrors and the like. In general, installation on the engine hood is also feasible, for example on the side of the engine hood facing the windshield, so that for example only objects projecting over the engine hood are visible. In an alternative embodiment, the optical detection device may be provided on the upper edge of the engine hood.

It should also be mentioned that the measurement range should be selected so that all objects to be considered for a frontal impact on the motor vehicle can be reliably detected.

According to another advantageous feature of the present invention, a collision object type may be determined from the measurement data of the optical detection device and used for adapting at least one criterion of the trigger condition. In this embodiment, the measurement data of the optical detection device are also evaluated beyond just the height of objects, for example to enable classification of possible or actual collision objects and to thereby establish another plausibility plane, for example by checking whether a collision object is a pedestrian. Such estimate can of course already be made before the collision actually occurs, for example, by continuously observing the area in front of the motor vehicle. Warnings and the like can thus be derived from the data of the optical detection device, which may generally also provide its measurement data to other vehicle systems of the motor vehicle capable of evaluating these measurement data, for example to driver assist systems and the like relating to longitudinal and transverse guidance. When, as described above, a collision object type is determined, this type can then also be used to adapt at least one criterion of the trigger condition by, for example, adapting threshold values, in particular also the height threshold value, depending on the collision object type, and the like.

Advantageously, at least one adjustable engine hood and/or an exterior windshield airbag may be triggered as a safety system depending on the trigger condition or a respective trigger condition. These examples for safety systems were already described in detail at the beginning. It would be advisable, both with an adjustable engine hood as well as with an exterior windshield airbag, to take the height criterion into account in the respective trigger conditions or in a common trigger condition, since the height criterion is particularly suited, especially with the aforedescribed suitable selection of the height threshold value, to estimate whether a collision object will move at all towards the engine hood and/or the windshield of the motor vehicle.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
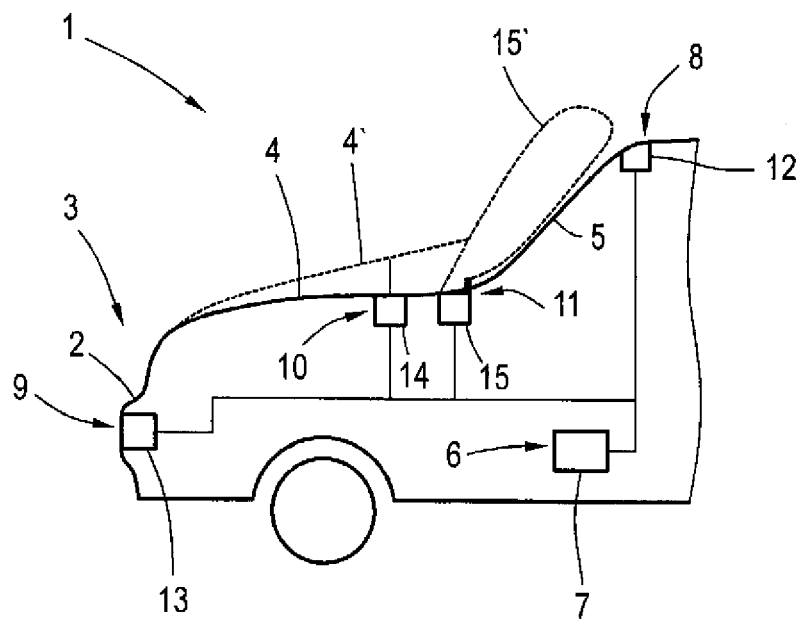
FIG. 1 shows a schematic diagram of a motor vehicle according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of a motor vehicle 1 according to the present invention, more precisely the front portion of a motor vehicle 1 according to the invention. The motor vehicle 1 includes a bumper 2 on its front end 3. As generally known, an engine hood 4 which essentially extends to a windshield 5 is arranged following the front end 3.

To reduce the severity of frontal collisions with a pedestrian as much a possible, the motor vehicle 1 includes a pedestrian protection system 6 with a control device 7 which evaluates measurement data from different detection devices 8, 9 in order to trigger safety systems 10, 11 of the motor vehicle 1 when a trigger condition is satisfied. However, a separate trigger condition may be associated with each of the safety systems 10, 11.

In the present exemplary embodiment, a PMD camera 12 is provided as optical detection device 8. Various collision sensors 13 forming an additional detection device 9 are arranged in the area of the bumper 2. The additional detection device 9 is based on a different measurement principle, with the collision sensors 13 supplying corresponding measurement data upon contact with a collision object.

In the present embodiment, an adjustable engine hood 4 with corresponding actuators 14 and an external windshield airbag 15 are provided as safety systems 10, 11. When the safety system 10 is triggered, the engine hood 4 is adjusted, as indicated by the position 4'; when the safety system 11 is triggered, the exterior airbag 15 is inflated into the shape 15' so that the windshield 5 is covered by the airbag 15. A pedestrian which is moved over the engine hood 4 farther toward the windshield 5 is caught by the adjusted engine hood 4 and the external airbag 15', thereby lessening the consequences of the accident.

The control device 7 is configured to carry out the method according to the invention, meaning that the data from the PMD camera 12 are evaluated with the control device 7 such that a height of the collision object is determined and compared with a height threshold value, thereby producing a height criterion within the context of the trigger condition.

Figure 2:
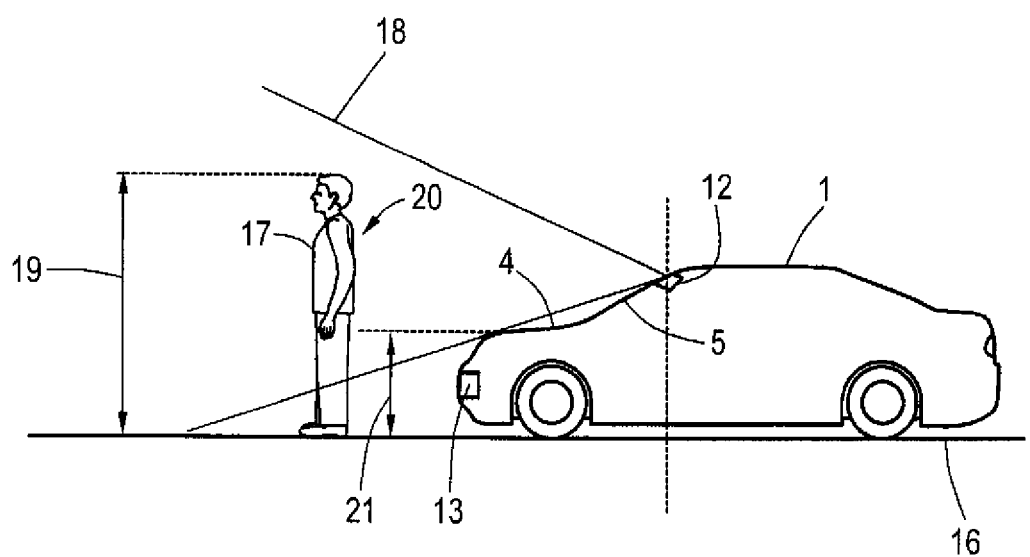
FIG. 2 shows a schematic side view of the motor vehicle according to the present invention.

More detail can be inferred from the schematic diagram of FIG. 2, which shows the motor vehicle 1 traveling on a road 16. A situation shortly before a collision with a pedestrian 17 is illustrated. The pedestrian 17 is obviously located in the measurement range 18 of the PMD camera 12. Because the camera 12 also supplies distance information and because the overall geometry and the position of the PMD camera 12 are known, the height 19 of the pedestrian 17 representing a collision object 20 can be determined from the measurement data of the PMD camera 12. The height 21 of the front edge of the engine hood 12 is hereby defined as height threshold value for satisfying the height criterion, meaning that it is checked whether the collision object 20 is taller than the height of the engine hood 4.

The PMD camera 12 is hereby located in an excellent position, because it is located on the upper edge of the windshield 5 inside the motor vehicle 1. The collision sensors 13 then respond only when the actual collision occurs.

Figure 3:
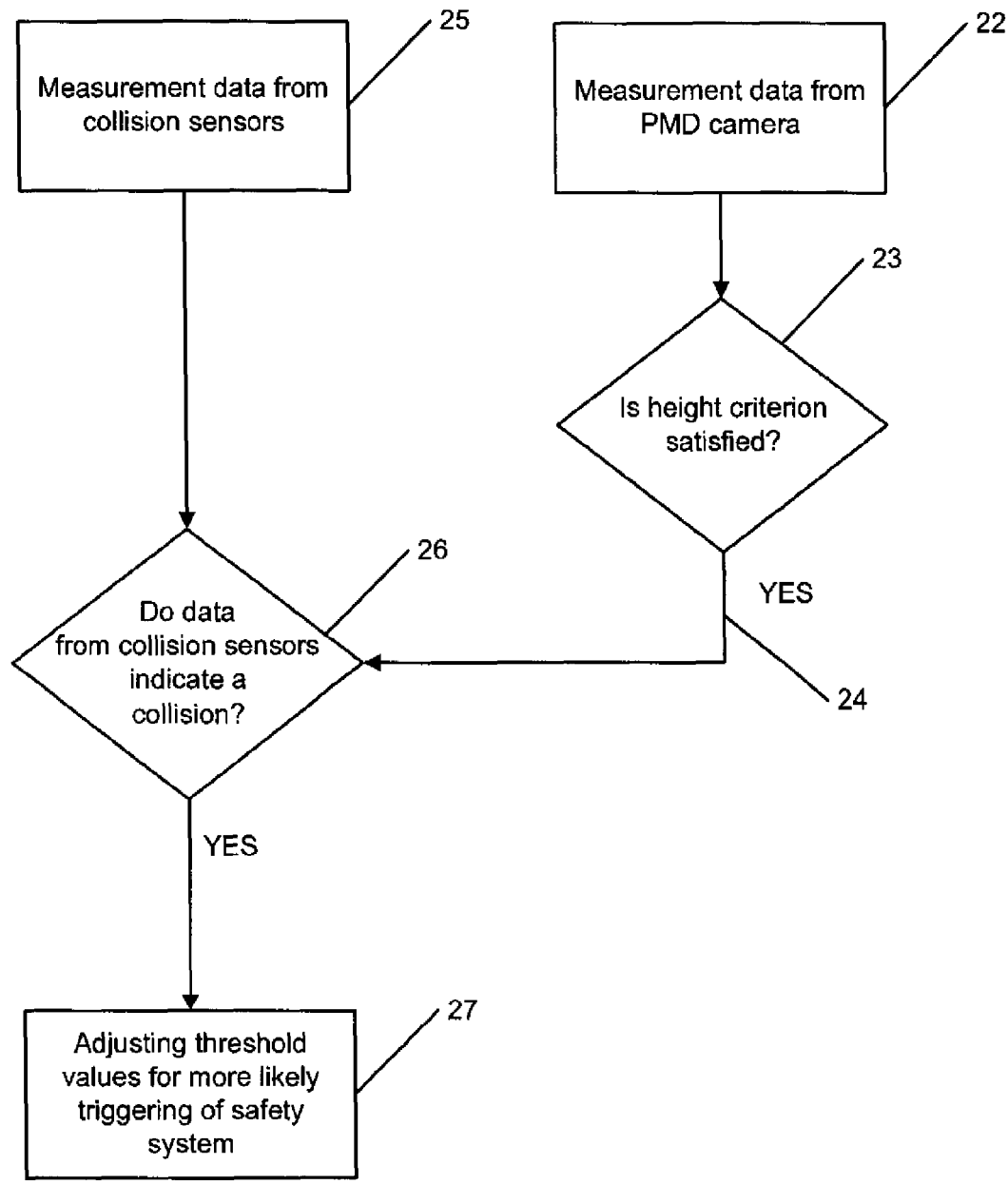
FIG. 3 shows a flow diagram of an exemplary embodiment of the method according to the present invention.

FIG. 3 shows how in an exemplary embodiment of the method according to the present invention the height criterion can be taken into account in the trigger condition. It should be noted here that in the illustrated exemplary embodiment of the method of the invention the measurement data from the PMD camera 12 are always evaluated continuously so as to be able to classify objects located in front of the motor vehicle 1, so that the fundamental classification of a collision object 20 as a pedestrian has already an effect on threshold values considered within the context of the trigger condition.

The measurement data 22 from the PMD camera 12 are evaluated based on the height criterion 23: If the height criterion 23 is satisfied, arrow 24, threshold values of a criterion 26 used to evaluate the measurement data 25 from the collision sensors 13 are adjusted so that the safety systems 10, 11 are more likely triggered, step 27, meaning that the threshold for triggering the safety systems 10, 11 is lowered. The height criterion 23 is hence used for a plausibility-related adjustment of the criterion 26.

It will be understood that other possibilities for taking into account the height criterion 23 within the trigger condition can be envisioned, for example by linking them with an AND-operation with the criterion 26 used to evaluate the measurement data 25 from the collision sensors 13.

It should also be noted that other types of three-dimensional optical detection devices 8 may be used, for example stereo cameras or mono-cameras with connected evaluation electronics, which are for example configured to evaluate the flow of the measurement data for determining a distance and hence also a height.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating a pedestrian protection system in a motor vehicle for reducing severity of an accident in a frontal collision with a pedestrian, comprising:

evaluating measurement data from at least two detection devices operating according to different measurement principles, wherein one of the at least two detection devices is an optical detection device and another of the at least two detection devices is a collision sensor responsive to contact with a collision object, determining a threshold value for triggering at least one safety system of the motor vehicle based on a height criterion which indicates whether a height of the collision object determined from measurement data from the optical detection device exceeds a height threshold value, determining a plausibility value based on the determined height criterion to indicate whether the collision object represents a pedestrian, when the plausibility value indicates that the collision object represents a pedestrian, adapting a criterion relating to measurement data from the other of the at least two detection devices for triggering of the at least one safety system, and decreasing a threshold for triggering the at least one safety system based on the adapted criterion.

2. The method of claim 1, wherein the height threshold value is selected as a height of a specific point of an engine hood of the motor vehicle above ground.

3. The method of claim 1, wherein the specific point of the engine hood is located at a front end of the engine hood.

4. The method of claim 1, wherein the optical detection device comprises a three-dimensional optical detection device.

5. The method of claim 4, wherein optical detection device comprises at least one of a PMD camera, a stereo camera and a mono-camera connected to an evaluation device evaluating the optical flux of the measurement data.

6. The method of claim 1, wherein the optical detection device is arranged in a region of a windshield of the motor vehicle.

7. The method of claim 6, wherein the optical detection device is arranged on an upper edge of the windshield.

8. The method of claim 6, wherein the optical detection device is arranged in an interior of the motor vehicle.

9. The method of claim 1, further comprising:
determining a collision object type from the measurement data of the optical detection device, and
adjusting at least one criterion of the at least one trigger condition based on the determined collision object type.

10. The method of claim 1, wherein at least one of an adjustable engine hood and an external windshield airbag are triggered as the at least one triggered safety system, depending on the threshold.

11. A motor vehicle, comprising
an optical detection device,
at least one additional detection device a collision sensor responsive to contact with a collision object,
at least one safety system, and
a pedestrian protection system for reducing severity of an accident in a frontal collision with a pedestrian,
wherein the pedestrian protection system comprises a control device configured to trigger at least one safety system depending on at least one trigger condition that evaluates measurement data from the optical detection device,
wherein the at least one trigger condition includes a height criterion indicating whether a height of a collision object determined from measurement data from an optical detection device exceeds a height threshold value,
the control device further configured to determine a plausibility value based on the determined height criterion to indicate whether the collision object represents a pedestrian and to adapt, when the plausibility value indicates that the collision object represents a pedestrian, a criterion relating to measurement data from the at least one additional detection device for triggering of the at least one safety system by decreasing a threshold for triggering of the at least one safety system.

* * * * *